United States Patent [19]

Eltvik

[11] Patent Number: 5,044,645
[45] Date of Patent: Sep. 3, 1991

[54] DOLLY FOR HEAVY OBJECTS

[75] Inventor: Bjorn Eltvik, Arboga, Sweden

[73] Assignee: Car-O-Liner Company, Wixom, Mich.

[21] Appl. No.: 488,603

[22] Filed: Mar. 2, 1990

[30] Foreign Application Priority Data

Mar. 2, 1989 [SE] Sweden .................................. 8900723

[51] Int. Cl.⁵ .................................................. B62B 3/10
[52] U.S. Cl. ................................................ 280/79.4
[58] Field of Search ............... 280/47.34, 35, 651, 280/79.11, 79.2, 79.4; 414/334, 426

[56] References Cited

U.S. PATENT DOCUMENTS 1,064,538  6/1913  Quickel ................................. 280/35
3,720,422  3/1973  Nelson .................................. 280/35

FOREIGN PATENT DOCUMENTS 1455722 11/1976 United Kingdom ............... 280/79.4

Primary Examiner—Andres Kashnikow
Assistant Examiner—Richard M. Camby
Attorney, Agent, or Firm—Barnes, Kisselle, Raisch, Choate, Whittemore & Hulbert

[57] ABSTRACT

A dolly for moving heavy objects and alternatively for holding heavy objects in a static position. The dolly has a U-shaped frame with rollers for supporting and moving a heavy object. In an alternate position, the frame blocks the movement of the heavy object.

14 Claims, 2 Drawing Sheets

DOLLY FOR HEAVY OBJECTS

FIELD OF THE INVENTION

This invention relates to dollies and chocks and more particularly to a combined dolly and chock for a wheel of a vehicle and other heavy round objects.

BACKGROUND OF THE INVENTION

Nowell U.S. Pat. No. 3,583,723 discloses a dolly for moving a vehicle having one or more incapacitated ground engaging wheels. The dolly has rollers carried by the legs of a U-shaped fixed frame with movable pads which can be raised under the incapacitated wheel to lift and support it above the surface on which the dolly rollers bear. Thus, the dolly provides a substitute rolling function for the incapacitated wheel so that the vehicle can be moved by rolling it inspite of the incapacitated vehicle wheel.

Previously, movement of a vehicle wheel has been prevented by placing at least one separate chock under it. Haynes U.S. Pat. No. 3,811,536 disclosed a chock with wedge-shaped stops which can be placed on the ground under both the front and back of a vehicle wheel to prevent it from rolling.

SUMMARY OF THE INVENTION

A dolly with a generally U-shaped frame with a telescopic bight portion adjustable so that the legs can bear on front and back portions of a ground engaging wheel of a vehicle. Rollers are attached to the legs so that in one position they bear on the ground while the frame supports the wheel above the ground for moving it and when the frame is turned over the rollers are disposed above the ground and the legs block movement of the wheel on the ground to provide a chock.

Objects, features and advantages of this invention are to provide a dolly that both supports heavy round objects above the ground for moving them and blocks such objects on the ground to prevent them from moving, is easy to manually set up and use, rugged, durable, and of relatively simple and economical design, manufacture and assembly.

BRIEF DESCRIPTION OF THE DRAWINGS

These and other objects, features and advantages of this invention will be apparent from the following detailed description, appended claims and accompanying drawings in which:

DETAILED DESCRIPTION

Figure 1:
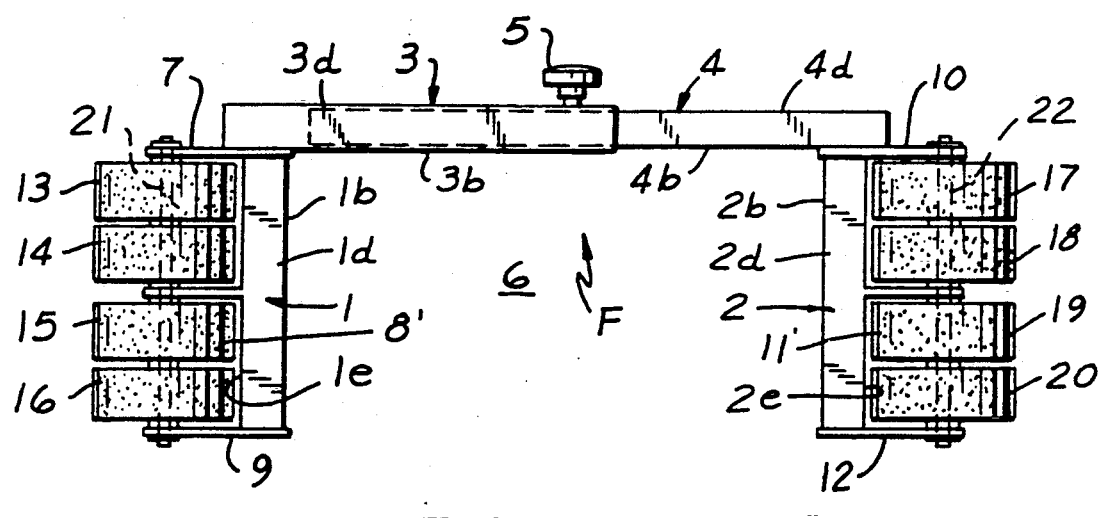
FIG. 1 is a top plan view of a dolly embodying this invention.

Referring in more detail to the drawings, FIG. 1 illustrates a dolly with a chassis structure that may be varied in length to accommodate varying sizes of heavy objects, particularly a wheel or tire of a damaged vehicle.

The chassis structure has a U-shaped frame F which is open at one side. The frame has two parallel and spaced apart tubes 1 and 2 each fixed at a right angle to one of two tubes 3 and 4 which slidably engage each other in a telescopic fashion. Preferably, all the tubes have a rectilinear and preferably square cross-section. Tubes 1 and 2 are transverse to and fixedly attached to the opposite ends of telescoping tubes 3 and 4, preferably on sides 3b and 4b. Therefore, the tubes form a horizontally lying, right angled U-shaped frame F, where tubes 1 and 2 constitute cross members, which extend laterally from the telescoping members 3 and 4, respectively. Tubes 3 and 4 slide longitudinally with respect to each other and may be locked in any desired position, preferably by a locking nut 5.

The region between the tubes defines an interior vertical opening 6 through the chassis structure. This opening 6 is adjustable to accommodate the varying sizes of different objects to be supported. Opening 6 has a width corresponding to the length of tubes 1 and 2 and has a length corresponding to the adjustable spacing between tubes 1 and 2, such length being determined by the telescoping displacement between tubes 3 and 4. The opening 6 may, if desired, be substantially wider than the object to be supported, for instance if the dolly should support two or more objects, such as two rear wheels of a vehicle.

Figure 2:
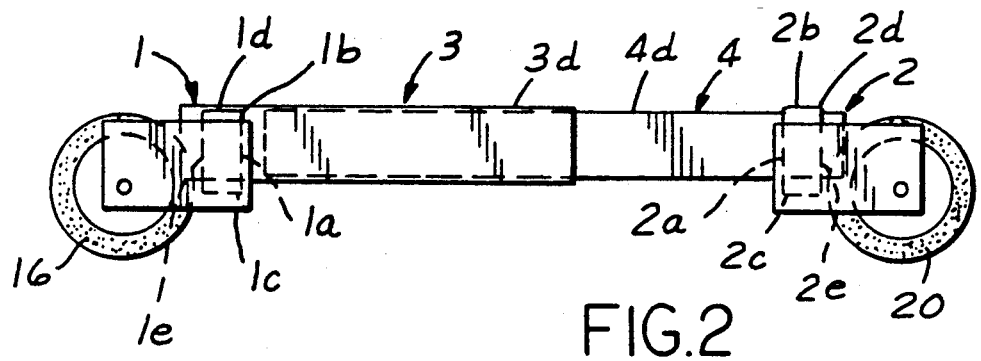
FIG. 2 is a side view of the dolly of FIG. 1.

To permit the dolly to roll on the ground or a floor 23 (see FIG. 3), rollers are mounted on the frame. Rollers 13, 14, 15 and 16 are mounted for rotation on a shaft 21 carried by plate shaped brackets 7, 8 and 9 fixed to side 1e of the tube 1. Similarly, rollers 17, 18, 19 and 20 are mounted on a shaft 22 carried by brackets 10, 11 and 12 fixed to side 2e of the tube 2. Preferably, the rollers are wheel-like cylinders as shown in FIGS. 1 and 2.

Figure 3:
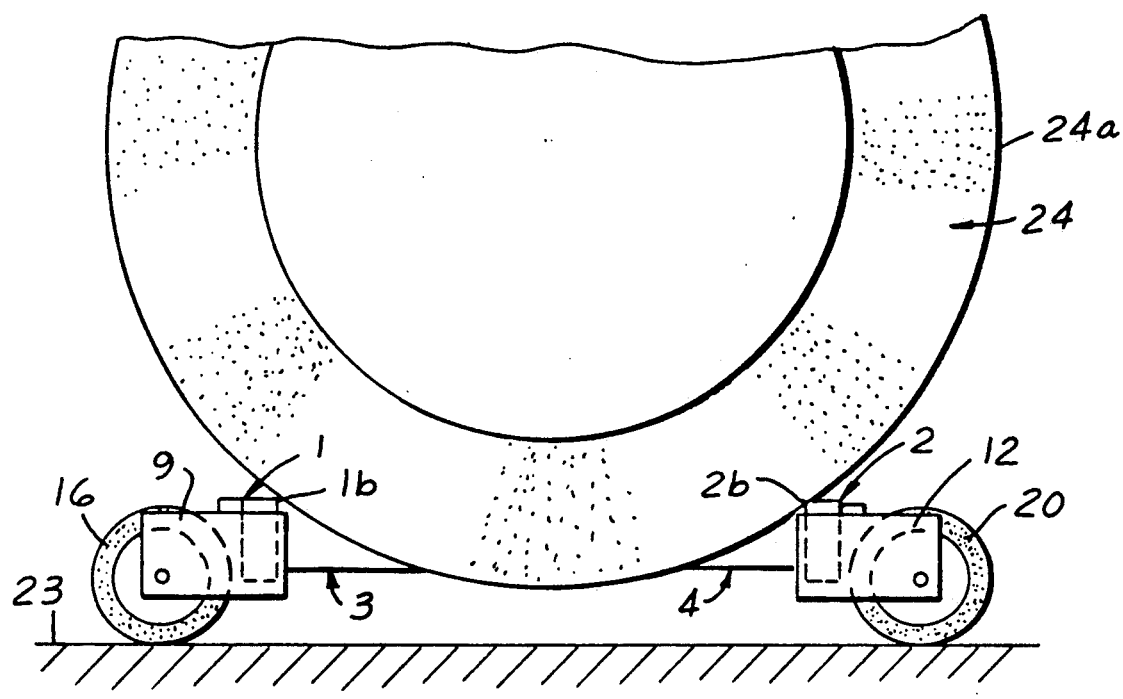
FIG. 3 is a side view of the dolly of FIG. 1, illustrating one working position with a vehicle wheel supported thereon.

In a first working position, as shown in FIG. 3, the dolly can roll on the ground or floor 23 while supporting an object such as a wheel 24 secured to a vehicle (not shown). In this position, first abutments for the object are formed by the upper inboard longitudinal edges 1b and 2b of the tubes 1 and 2.

When an object is to be supported and moved by the dolly, the object must be raised, the telescoping members 3 and 4 must be adjusted and locked at a distance between tubes 1 and 2 such that the object will not reach down to or bear on the ground or floor 23 when lowered into opening 6. Then the object is lowered into opening 6 until it rests on tube upper edges 1b, 2b. The vehicle then may be rolled along the ground or floor 23 to its desired position as shown in FIG. 3.

Figure 4:
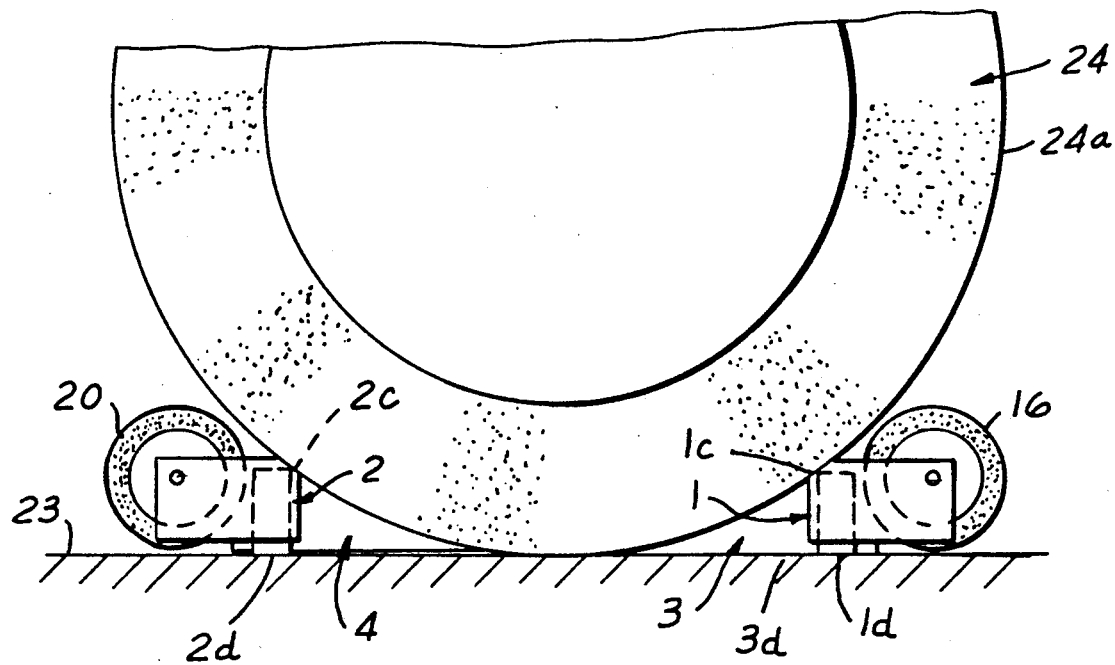
FIG. 4 is a side view of the dolly of FIG. 1, illustrating an alternate working position with a vehicle wheel blocked from moving on its support surface.

As shown in FIG. 4, if the dolly is turned over or upside-down to a second working position to serve as a chock, the outer periphery of the rollers will not extend down to or bear on the ground or floor. This is accomplished by locating the top of the frame F wholly above the outer periphery of rollers 13-20. Thus, preferably the tube top sides 1d, 2d and 3d all lie is essentially a common plane that is located above the rollers. In this position, second abutments for an object to be held in a static position are formed by the lower inboard longitudinal edges 1c and 2c of the tubes 1 and 2.

The telescopic arrangement of tubes 3 and 4 requires that tube 4 have somewhat smaller transverse dimensions than tube 3. Therefore, the top side 4d of tube 4 will not abut the ground or floor 23 in the upside-down position of the dolly. But the plane top sides 1d, 2d, 3d (the major portion of the top surface of the frame) of tubes 1, 2, 3 lie in a common plane to form a surface for abutting against floor 23 in the upside-down position of the dolly.

The coefficient of friction of the abutment surfaces 1d, 2d, 3d is selected sufficiently high to guarantee the dolly in this upside-down position will not be able to slide on the ground or floor 23. If the object that is to be supported is very heavy, this will normally not require any special surface with a high coefficient of friction for top sides 1d, 2d, 3d in order to guarantee that the dolly will not slide in its upside-down position.

As shown in FIG. 4, the dolly in its upside-down position can be used as a chock. By sliding the open side of the U-shaped frame F laterally toward wheel 24, the frame F is placed under wheel 24 without any need to lift the wheel 24 from the ground or floor 23. Before placing the dolly upside-down under the wheel 24, the telescoping members 3 and 4 are extended a sufficient distance so that tubes 1 and 2 can be placed on opposite sides of the wheel 24. Then, tubes 3 and 4 are telescopically moved toward each other until the edges 1c, 2c of the tubes 1 and 2 come into contact with opposite sides of the outer circumference or periphery 24a of the tire 24 whereafter tubes 3 and 4 are locked in this position by tightening locking nut 5. In this application, the tire periphery 24a will rest against the ground or floor 23 and edges 1c, 2c.

Alternatively, it is of course possible to adjust the length of the chock opening 6 such that the tire 24 will be supported by the chock tubes 1 and 2 with the tire periphery 24a spaced above the ground or floor 23. In this alternate application, and in an application where the tire 24 is to be supported by the dolly in its rolling position as shown in FIG. 3 (where the tire periphery 24a must not touch the ground or floor 23), the distance between the tubes 1 and 2 has to be adjusted to a smaller value than in the alternate chock application shown in FIG. 4. Therefore wheel 24 is lifted by a lifting jack or the like, the dolly is positioned under the tire 24 and then the tire 24 is lowered down into opening 6 of frame F until the circumference 24a of wheel 24 comes into contact with and rests against abutment edges 1c and 2c of the tubes.

I claim:

1. A dolly for moving a heavy object along a support surface and holding a heavy object in a static position comprising:
    (a) a main frame including a telescoping member, means for releasably locking said telescoping member to a predetermined length, and at least two cross members transverse to said telescoping member and fixedly attached on one side of said telescoping member, wherein said frame has a top side, a bottom side and a generally U-shaped opening, said telescoping member varies the distance between said cross members and the length of said opening;
    (b) wheels carried by said frame for rolling said frame on the support surface, said wheels being carried by said frame such that their peripheries are positioned in part below the plane of said bottom side of said frame for engagement of said wheels with the support surface when said frame is in an upright position and completely below the plane of said top side of said frame for disengagement from the support surface when said frame is in an upside-down position,
    (c) a first pair of abutment means carried by said cross members in generally opposed relation, disposed wholly above the support surface when said frame is in its upright position, and constructed and arranged to engage and support a heavy round object wholly above the support surface when said frame is in its upright position,
    (d) a second pair of abutment means carried by said cross members in opposed relation, disposed below the plane of the top side of the frame and above the support surface when said frame is in its upright position, and constructed and arranged to engage a heavy round object when said frame is in its upside-down position, and
    (e) abutment surfaces carried by said cross members, lying in generally the same plane and engagable with the support surface when said frame is in its upside-down position to thereby restrain the heavy round object in a substantially static position and none of the components of said dolly projecting beyond said plane of said abutment surfaces carried by said cross members.

2. The dolly of claim 1 wherein said telescoping member comprises a first tube and a second tube slidably receivable in said first tube.

3. The dolly of claim 2 wherein said locking means is a locking nut on said first tube and wherein said nut is engageable with the outer periphery of said second tube such that said first and second tubes can be releasably locked at a preselected overall length.

4. The dolly of claim 2 wherein said cross members are third and fourth tubes having at least its top side in the same plane as the top side of said first tube, said third and fourth tubes fixedly attached to opposite ends of said first tube and said second tube whereby said inner peripheral sides of said first, second, third and fourth tubes define said opening for the heavy object.

5. The dolly of claim 4 wherein said top side has a coefficient of friction high enough to prevent said top side from sliding along the support surface to hold the heavy object in a static position.

6. The dolly of claim 4 wherein said tubes have a square cross-section.

7. The dolly of claim 1 which also comprises a plurality of brackets longitudinally extending from and fixed to said cross members, at least a first and second shafts mounted on said brackets and adjacent said cross members, and said wheels are rotatably mounted on said shafts.

8. A dolly for moving a heavy object along a support surface and holding a heavy object in a static position comprising:
    (a) a main frame including a telescoping member, means for releasably locking said telescoping member to a predetermined length, and at least two cross members transverse to said telescoping member and fixedly attached on one side of said telescoping member, wherein said frame has a top side, a bottom side and a generally U-shaped opening, said telescoping member varies the distance between said cross members and the length of said opening;
    (b) wheels carried by said frame for rolling said frame on the support surface, said wheels being carried by said frame such that their peripheries are positioned in part below the plane of said bottom side of said frame for engagement of said wheels with the support surface when said frame is in an upright position and completely below the plane of said top side of said frame for disengagement from the support surface when said frame is in an upside-down position;

(c) a first pair of abutment means carried by said cross members in generally opposed relation, disposed wholly above the support surface when said frame is in its upright position, and constructed and arranged to engage and support a heavy round object wholly above the support surface when said frame is in its upright position, (d) a second pair of abutment means carried by said cross members in opposed relation, disposed below the plane of the top side of the frame and above the support surface when said frame is in its upright position and constructed and arranged to engage a heavy round object to restrain it in a substantially static position when said frame is in its upside-down position and engaging the support surface, and (e) said cross members comprise tubes, said first pair of abutment means comprises a first pair of edges of said tubes, and said second pair of albutment means comprises a second pair of edges of said tubes spaced from said first pair of edges thereof.

9. The dolly of claim 8 wherein said telescoping member comprises a first tube and a second tube slidably receivable in said first tube.

10. The dolly of claim 9 wherein said locking means is a locking nut on said first tube and wherein said nut is engagable with the outer periphery of said second tube such that said first and second tubes can be releasably locked at a preselected overall length.

11. The dolly of claim 9 wherein said cross members are third and fourth tubes having at least its top side in the same plane as the top side of said first tube, said third and fourth tubes fixedly attached to opposite ends of said first tube and said second tube whereby said inner peripheral sides of said first, second, third and fourth tubes define said opening for the heavy object.

12. The dolly of claim 11 wherein said top side has a coefficient of friction high enough to prevent said top side from sliding along the support surface to hold the heavy object in a static position.

13. The dolly of claim 11 wherein said tubes have a square cross-section.

14. The dolly of claim 8 which also comprises a plurality of brackets longitudinally extending from and fixed to said cross members, at least a first and second shafts mounted on said brackets and adjacent said cross members, and said wheels are rotatably mounted on said shafts.

* * * * *